Patented June 29, 1943

2,322,837

UNITED STATES PATENT OFFICE 2,322,837

PRINTING COMPOSITION

Linus Marvin Ellis, Wilmington, Del., assignor to E. I. du Pont de Nemours & Company, Wilmington, Del., a corporation of Delaware No Drawing. Application August 14, 1940, Serial No. 352,521

4 Claims. (Cl. 260—23)

A. This invention relates to lacquer emulsions which find particular use in printing textiles.

B. Formerly, textiles were generally colored by dyeing them, either by applying the dyestuff in selected patterns, or by padding the textile with one component of the dye and applying another component, the reaction of which produces the color, in a selected pattern to the padded fabric. Textiles so colored are flexible, soft, and as fast as the color used. Azo and vat dyes were, and still are, largely used in that art.

C. More recently it has been proposed to color textiles with pigments by applying them to the fabric in lacquer emulsions and breaking the emulsions. The coloring of fabrics in this manner has often involved an undesirably long drying operation, and fabrics so colored have frequently been lacking in fastness and are of inferior softness and flexibility.

D. It is an object of the invention to prepare lacquer emulsions which, when applied to textiles, are of superior flexibility, softness, and toughness, which are fast to the various tests, insoluble in the ordinary solvents used for dry cleaning, and which dry quickly and require no aftertreatment.

E. The objects of the invention are accomplished, generally speaking, by lacquer emulsions which may be either of the water-in-oil or oil-in-water type and which contain as the major film-forming ingredient an interpolymer of a drying oil with certain vinyl or vinylidene compounds. By interpolymer of a drying oil with a vinyl or vinylidene compound is meant the polymeric product resulting from the polymerization of a said compound in the presence of a drying oil, in which product molecules of the said compound and drying oil are linked together to form a product containing both.

F. The drying oils which may be used in the making of the interpolymers include all the members of the class of oils which show drying properties, and include such compounds when untreated, when heated in admixture with a varnish resin, when blown with air or other effective gases at ordinary or elevated temperatures, or which have been bodied by the action of heat or by other means. Among the varnish resins which have been used in admixture with the drying oil are rosin, copal, and kauri gum, ester gum, phenol-formaldehyde condensation products, and natural and synthetic resins in general. The drying oils include both natural and synthetic drying oils, examples of the latter class being those made by the dehydration of castor oil and by the esterification of polyhydric alcohols with the acids of the natural drying oils.

G. By the term vinyl compound, as used herein, is meant vinyl acetate and styrene and by the term vinylidine, as used herein, is meant esters of methacrylic acid.

H. The compositions produced by the use of the interpolymers described have quick drying characteristics particularly at elevated temperatures and dry very rapidly to a tack-free condition, subsequently hardening to insoluble materials in a manner analogous to that of drying oils. Drying oils interpolymerized with styrene, vinyl acetate, and esters of methacrylic acid exhibit these characteristics to a preferred degree. It is generally desirable that the interpolymer contain a proportion of the vinyl or vinylidene component equal to or greater than the proportion of the drying oil component.

I. Since the drying of the interpolymers used in the present compositions is in some respects analogous to the drying of the siccative oils, drying agents such as compounds of the heavy metals, such as lead, cobalt and manganese, may be included in the compositions.

J. Organic solvents are preferably used to dissolve the vinyl-oil or vinylidene-oil film-forming constituent, mixtures of such solvents being frequently preferred. It is desirable that the solvent should form a homogeneous solution with the resin. It is unimportant whether the solvent be aliphatic or aromatic in its structure. Petroleum solvents are particularly desirable, mainly because of their low cost, and alcoholic solvents can frequently be used to secure homogeneity of the resin solution and to increase the degree of dispersion of the pigment.

K. The main requirement for the pigment used in the composition is that it shall be insoluble in, and unaffected by, the ingredients of the paste or by the conditions under which it is applied. Satisfactory pigments are shown in the examples. Other satisfactory pigments are inorganic, such as the finely divided metals, metallic oxides, iron blues and the like, titanium oxide, and carbon blacks. Certain of these pigments are better used in water-in-oil emulsions and others in oil-in-water emulsions, but the choice of the particular pigment rests largely with the chemists. In many instances organic are to be preferred to inorganic pigments because of their wide variety of color and shade and because they are less abrasive. Azo pigments and vat dyestuff pigments, which may be used in themselves or as lakes and toners, are particularly suitable.

L. The ratio of resin to pigment employed in the compositions of this invention will be subject to considerable variation depending on the use for which the compositions are intended. For compositions to be used in printing, the resin to pigment ratio may well be more than 4 to 1 for the heavily pigmented, and as high as 20 or 30 to 1 for the lightly pigmented emulsions. Other ratios may be used. For compositions to be used in impregnating textile fabrics the resin content of the emulsion need not be above about 4% unless it is desired to secure some sort of permanently starched effect or the like. The resin to pigment ratio ordinarily will fall between 10 to 1 and 30 to 1.

M. The water used in the emulsions which constitute the compositions of this invention may contain appreciable quantities of dissolved inorganic salts or of organic water-soluble substances such as glycol, glycerine or the like. The use of water which contains an appreciable quantity of a salt such as sodium chloride is frequently desirable as a means of improving the viscosity and flow characteristics of emulsions which are to be used for intaglio printing.

N. The relative proportions of organic solvent and of water employed in the emulsions are an important means of controlling the viscosity characteristics of the emulsions. In general, the viscosity of water-in-oil type emulsions is increased by increasing the relative proportion of water to organic solvent, and decreased by increasing the relative proportion of organic solvent to water. Opposite effects are produced by similar changes in oil-in-water type emulsions. For intaglio printing compositions a relatively viscous emulsion of the water-in-oil type is usually preferred. For coloring fabrics by impregnation, a relatively non-viscous composition of the oil-in-water type is usually preferred. This usage of the different types of emulsions has the advantage of being most economical because relatively small amounts of organic solvent are required. The viscosity of the different types of emulsions may be adjusted over a relatively wide range by changing the relative proportions of water and organic solvent used.

O. The use of several emulsifying agents in the composition of this invention has been illustrated in the examples. Various other emulsifying agents or protective colloids may be used in the compositions to aid in securing an emulsion or to render it more stable. The nature of the emulsifying agent will depend on the type of emulsion in which it is to be used. For water-in-oil type emulsions the oxidized vegetable oils, and the soaps of metals such as aluminum, magnesium or calcium are useful as emulsifying agents, and finely divided materials such as the colloidal clays are useful as protective colloids. For oil-in-water type emulsions water-soluble soaps such as the sodium of potassium soaps, and the sodium salts of the sulfates of the higher alcohols are particularly useful as emulsifying agents.

P. Although the emulsions of the examples have all been pigmented, it is frequently desirable to employ the compositions in the form of unpigmented emulsions. Such unpigmented emulsions may be employed to dilute a pigmented composition to desired lower pigment concentration.

Q. The following examples are illustrative, but not limitative, of the invention.

EXAMPLE I

A vinyl acetate-linseed oil interpolymer is prepared as follows:

A mixture of 200 parts of air-blown linseed oil of viscosity Z-2 on the Gardner-Holdt scale, 1600 parts vinyl acetate and 16 parts benzoyl peroxide is placed in a reaction vessel equipped with a reflux condenser and agitator, and heated with stirring at reflux temperature for 15½ hours. At the end of this time the reaction mixture is found by analysis to contain 42.66% non-distillable material, corresponding to the presence of an interpolymer containing 74.4% vinyl acetate. The condenser on the reaction vessel is then arranged for distillation, and unreacted vinyl acetate is distilled off under pressure sufficiently reduced to maintain the distillation temperature below 60° C. A total of 1000 parts of xylene is added slowly to the reaction mixture during this distillation. A yield of 1925 parts of a 40% solution of the resinous interpolymer of vinyl acetate and linseed oil is obtained by this procedure.

An emulsion suitable for intaglio printing on textile fabrics is prepared as follows:

Seven and one half parts of an aqueous slurry containing 1.5 parts of finely divided blue copper phthalocyanine pigment is dispersed by high speed stirring in a mixture containing 37.5 parts of the resin solution obtained as described above, 5 parts pine oil and 26.5 parts of a hydrocarbon solvent derived from petroleum and having a boiling range of 145–210° C. and solvent characteristics similar to those of the aromatic hydrocarbons. Eighty-one parts of water are then added to this dispersion with high speed stirring to produce a water-in-oil type emulsion having viscosity and flow characteristics which make it excellently suited for use in intaglio printing on textile fabrics.

Prints made from an engraved roll on cotton cloth with this emulsion have good sharpness of outline. They dry in less than one minute at 100° C. to a non-tacky condition. When a piece of white cotton cloth is rubbed briskly under light pressure over the surface of the dried print, relatively little of the color is transferred to this piece of cloth, thus indicating that the print has good fastness to rub-off.

EXAMPLE II

An emulsion suitable for coloring textile fabrics by impregnation is prepared as follows:

A portion of the solution of the resinous interpolymer obtained as described in Example I is diluted with three times its weight of xylene. Five parts of an aqueous slurry containing 1 part of finely divided blue copper phthalocyanine pigment is then dispersed in 200 parts of this diluted solution by means of high speed stirring. An oil-in-water type emulsion is then prepared by stirring 51.5 parts of the above dispersion and 8.5 parts of octyl alcohol into 140 parts of an aqueous solution which contains 0.25 parts sodium lauryl sulfate. The emulsion obtained in this manner is thin and fluid.

A strip of cotton cloth is saturated with this solution and the excess removed by passing the cloth through a wringer. The cloth is dried at 100° C. A fabric of an attractive light shade and free from any unpleasant stiffness is obtained. The color has good fastness to rub-off and fair fastness to laundering.

EXAMPLE III

*Preparation of a styrene China-wood oil interpolymer*

For this, a China-wood oil—"Amberol F-7" varnish is first prepared by heating 6975 parts raw China-wood oil and 775 parts "Amberol F-7" (an oil-soluble, rosin-ester gum modified phenol-formaldehyde resin containing approximately 20% of the phenolic constituent and having an acid number of 14 to 20) in a stainless steel kettle during a period of 45 minutes to 225° C. The mixture is maintained at this temperature for 15 minutes, and then allowed to cool to approximately 200° C. during the ensuing 20 minutes. It is then thinned by the addition of 7750 parts xylene. After cooling, this solution is filtered through felt.

The interpolymer is prepared from 4533 parts of the above varnish solution, 45,330 parts of a 30% solution of styrene in xylene and 138 parts benzoyl peroxide by heating these materials under reflux with stirring at 225° C. for 6 hours. A mixture of xylene and unreacted styrene is then removed by steam distillation until 10,230 parts of residue are left. This residue is a 55.5% solution of the resinous interpolymer, which has a styrene content of 57.8%.

A pigmented emulsion suitable for use in intaglio printing is prepared as follows:

Fifty parts of the resin solution prepared as described above, 15 parts of an aqueous slurry containing 3 parts of finely divided blue copper phthalocyanine pigment, 3 parts of an aqueous solution containing 0.6 part trimethyl stearyl ammonium bromide, and 81.25 parts of the hydrocarbon solvent used in the emulsion of Example I are mixed together and subjected to high speed stirring to effect a dispersion of the pigment. To this dispersion is then added with high speed stirring a dispersion of 2.25 parts bentonite of particle size less than 5 microns in a mixture of 10.5 parts glycerine and 150 parts water. An emulsion of the water-in-oil type is thus obtained. Prints made on cotton cloth from an engraved roll with this emulsion have sharp outline and good color strength, and dry rapidly at 100° C. The dried prints have good fastness to rub-off, and very good fastness to laundering.

EXAMPLE IV

An interpolymer of ethyl methacrylate and China-wood oil is prepared as follows:

A mixture of 375 parts of a solution of China-wood oil—"Amberol F-7" varnish whose preparation is described in Example II, 750 parts freshly distilled ethyl methacrylate, 750 parts xylene and 7.5 parts benzoyl peroxide is heated with stirring for three hours at approximately 100° C. Analysis of the resin solution then shows 55.8% of the solid resin to be ethyl methacrylate. The unreacted ethyl methacrylate is removed under reduced pressure. This removal of the ethyl methacrylate is accompanied by a slow addition of xylene in quantity regulated to yield a final solution having a resinous interpolymer content of 40%.

A pigmented water-in-oil type emulsion having viscosity and flow characteristics which make it suitable for use in intaglio printing on textiles is prepared as follows:

Seven parts of an aqueous slurry containing 1.5 parts of finely divided blue copper phthalocyanine pigment are dispersed by means of high speed stirring in a mixture of 37.5 parts of the above resinous interpolymer solution with 30 parts of aliphatic hydrocarbon solvent of boiling range 145–216 C. Into this dispersion are emulsified 75 parts water.

Prints made on cotton cloth with this emulsion have good sharpness of outline and color strength. The time required for drying at 100° C. is considerably less than one minute. Prints which have been baked for five minutes at 100° C. are extremely fast to rub-off, and show excellent fastness to laundering at 93–99° C., as well as fastness to laundering in the presence of small amounts of chlorine. The prints are unaffected by treatment with alcohol-acetone mixture, or by treatment with other common organic solvents such as are used in dry cleaning.

EXAMPLE V

A composition suitable for coloring fabrics by impregnation is prepared as follows:

Five parts of an aqueous slurry which contains 1 part of finely divided blue copper phthalocyanine pigment is dispersed by means of high speed stirring in a mixture of 150 parts xylene with 50 parts of the solution of ethyl methacrylate-China-wood oil interpolymer whose preparation is described in Example 4. An oil-in-water type emulsion is then prepared by emulsifying 51.5 parts of this dispersion and 8.5 parts octyl alcohol in 140 parts of water in which has been dissolved 0.25 g. sodium lauryl sulfate.

A cotton fabric is impregnated with this emulsion and dried according to the procedure given in Example II. The fabric thus treated is colored an attractive light shade of blue, and has even better fastness to rub-off and to laundering than has the fabric treated as described in Example II.

EXAMPLE VI

An interpolymer of vinyl acetate having a greater content of linseed oil than does the interpolymer whose preparation is described in Example I is prepared as follows:

A mixture containing 200 parts of air-blown linseed oil of viscosity Z–2 on the Gardner-Holdt scale, 1600 parts vinyl acetate and 16 parts benzoyl peroxide is heated at the reflux for approximately 5 hours. At the end of this time analysis shows 25% of the reaction mixture to be non-distillable, indicating the presence of an interpolymer whose vinyl acetate content is 54%. Unreacted vinyl acetate is then distilled off under pressure reduced sufficiently to maintain the distillation temperature below 60° C., with the simultaneous slow addition of xylene. The quantity of xylene added is regulated so as to yield a final 40% solution of the resinous interpolymer.

The preparation of an emulsion for intaglio printing on textiles is carried out as follows:

A mixture of 37.5 parts of the solution of the resinous interpolymer prepared as described above, 2.5 parts pine oil, 27.5 parts of aliphatic type hydrocarbon solvent of boiling range 145–216° C., and 7.5 parts of an aqueous slurry which contains 1.5 parts finely divided blue copper phthalocyanine pigment is subjected to high speed stirring in order to secure dispersion of the pigment. A water-in-oil type emulsion is obtained by adding 75 parts water to this dispersion with high speed stirring.

Prints made on cotton cloth with this emulsion have good sharpness of outline and good color strength, and dry rapidly at 100° C. The dried prints have excellent fastness to rub-off.

EXAMPLE VII

An interpolymer of China-wood oil with mixed methyl and isobutyl methacrylates is prepared as follows:

A mixture of 500 parts of a China-wood oil—"Amberol F-7" varnish solution whose preparation is described in Example III, 333 parts isobutyl methacrylate, 667 parts methyl methacrylate, 1000 parts xylene and 10 parts benzoyl peroxide is heated at approximately 100° C. for 2½ hours. At the end of this time analysis shows 22.66% of the reaction mixture to be non-distillable, thus indicating that the interpolymer present in the reaction mixture has a methacrylate content of 56%. The unreacted methyl and isobutyl methacrylates are distilled off under reduced pressure at a temperature below 60° C. with the continuous slow addition of xylene in quantity regulated to yield a final 40% solution of the interpolymer.

An emulsion suitable for intaglio printing on textile fabrics is prepared by using the procedure and quantities given for the preparation of the emulsion of Example IV, with the substitution of the interpolymer solution prepared as described in this example for that prepared as described in Example IV, and with the additional substitution of the aromatic type hydrocarbon solvent used in the preparation of the emulsion of Example I for the aliphatic type hydrocarbon solvent used in the preparation of the emulsion of Example IV.

Prints made with the emulsion prepared in this manner had sharpness, color strength, drying and fastness characteristics equivalent to those of prints made with the emulsion of Example IV.

R. The invention is primarily intended to furnish compositions which may be used for coloring or decorating textile fabrics. However, the compositions may be used for various other purposes, such as for printing or marking on rubber, paper, leather, leather cloth, wood and all manner of fibrous materials; for the impregnation of paper, leather and other fibrous materials; and for the decoration of or impregnation of earthenware, unglazed china and similar materials.

S. When the printing or coloring of the fabric is accomplished by means of compositions which contain a pigment and a resin to effect adhesion of the pigment to the fibers of the fabric, a simple drying operation is substituted for the aftertreatment attendant on certain dyeing operations. The printing of fabrics by my invention produces high adhesion of the pigment to the fibers of the fabric, and enables the production of prints of great fineness and sharpness of outline. In this respect my compositions are far superior to any known dyeing process. This is not the case with the compositions commonly used for such printing. The extent to which the sharpness of outline of the prints can be controlled, when made with such compositions, is limited.

T. However, the advantages to be realized by use of printing or coloring compositions which contain a pigment and a resin for binding this pigment to the fabric have frequently been offset in the past by certain disadvantages resulting from their use. The fabrics were frequently rendered excessively stiff and unpleasant to feel. The binders frequently did not render the color sufficiently fast to rub-off, or to laundering, or to the action of organic solvents. The present invention furnishes compositions by whose use the advantages inherent in printing or coloring fabrics with a resin and a binder are retained, and by which the disadvantage of excessive stiffness and of poor fastness is overcome.

U. As many apparently widely different embodiments of this invention may be made without departing from the spirit and scope thereof, it is understood that I do not limit myself to the specific embodiments thereof except as defined in the appended claims.

I claim:

1. A printing composition for printing textiles being an emulsion consisting essentially of an interpolymer of one of the group of compounds consisting of styrene, vinyl acetate, and esters of methacrylic acid with a drying oil in which the drying oil is present in an amount not greater than the other component, a solvent therefor being insoluble in water, an insoluble pigment and water.

2. A printing composition for printing textiles being an emulsion consisting essentially of an interpolymer of vinyl acetate with a drying oil in which the drying oil is present in an amount not greater than the vinyl acetate, a solvent therefor being insoluble in water, an insoluble pigment and water.

3. A printing composition for printing textiles being an emulsion consisting essentially of an interpolymer of styrene with a drying oil in which the drying oil is present in an amount not greater than the styrene, a solvent therefor being insoluble in water, an insoluble pigment and water.

4. A printing composition for printing textiles being an emulsion consisting essentially of an interpolymer of an ester of methacrylic acid with a drying oil in which the drying oil is present in an amount not greater than the ester, a solvent therefor being insoluble in water, an insoluble pigment and water.

LINUS MARVIN ELLIS.